Feb. 18, 1941.  L. O. STARK  2,232,571
HORN SEED SOWER
Filed Aug. 16, 1940
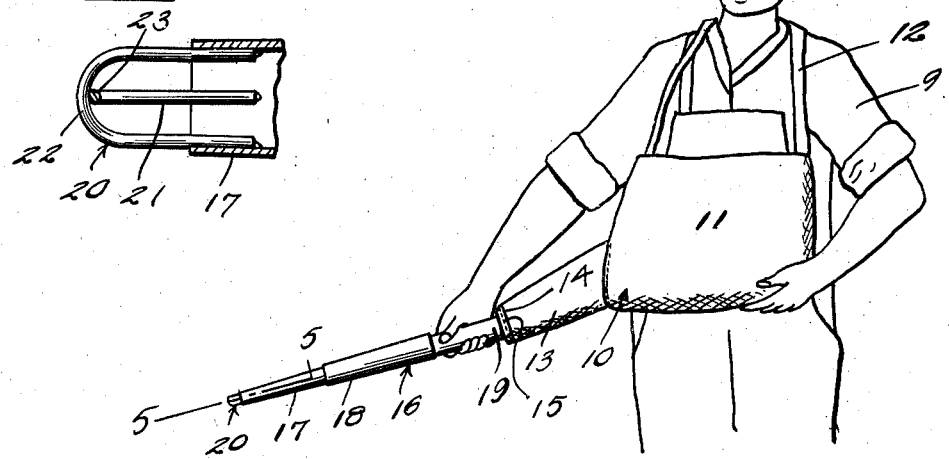
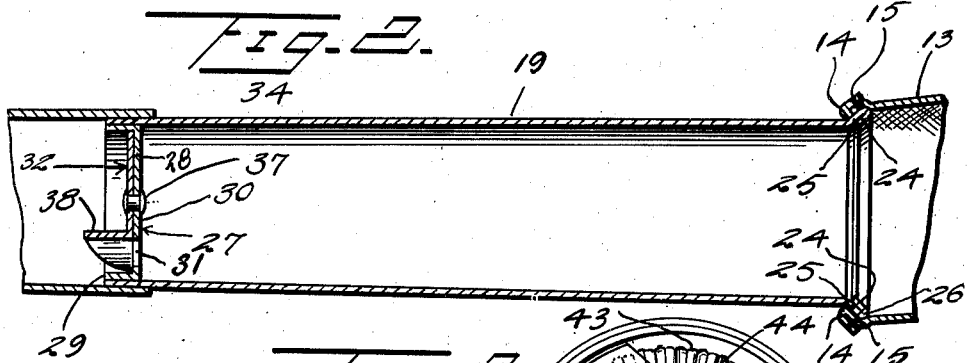
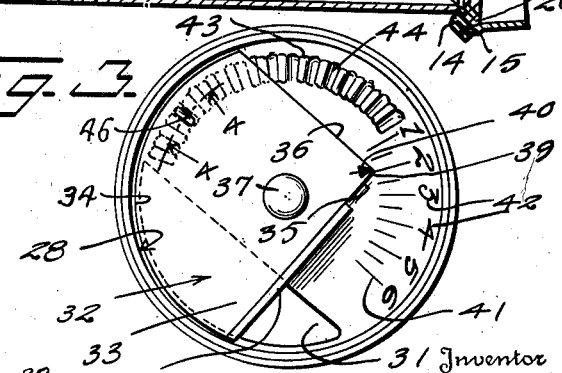
Inventor
Levi O. Stark
By Kimmel & Crowell
Attorneys
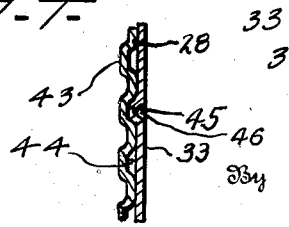

Patented Feb. 18, 1941

2,232,571

UNITED STATES PATENT OFFICE 2,232,571

HORN SEED SOWER

Levi O. Stark, Urbana, Ind., assignor to The Cyclone Seeder Co., Inc., Urbana, Ind.

Application August 16, 1940, Serial No. 352,979

2 Claims. (Cl. 221—119)

This invention relates to a seed sower or distributer of the manually operable and portable type, and it is an improvement upon the horn type seed sower, or seeder forming the subject of Letters Patent 1,469,118, granted September 25, 1923.

The invention not only embodies the objects and advantages of the patent aforesaid, but further aims to provide the inner end of the regulator carrying section of the sectional distributing horn with means for detachably securing the outlet end of the spout of the seed carrying bag or sack thereto.

The invention further aims to provide, in a manner as hereinafter set forth, a seed sower including a distributing horn formed of a plurality of detachably connected sections, one of which constitutes a hand grip to be attached at its inner end to the spout of the seed carrying bag and at its outer end having arranged therein means for regulating the number or volume of seed to be broadcasted from the horn.

The invention further aims to provide, in a manner as hereinafter set forth, a seed sower of the class referred to including spaced oppositely disposed means extended from the outer end of the outer section of a sectional distributing horn to insure of the proper spray or spread of the seed when broadcasted.

The invention further aims to provide, in a manner as hereinafter set forth, a device of the class referred to with a regulator forwardly of the inner end of the horn including a scale of digits having correlating therewith a row of graduations, and a pointer coacting with the latter for determining the regulation desired of the amount of seed to be sowed.

The invention further aims to provide, in a manner as hereinafter set forth, a device for the purpose referred to including a regulator having a passage for the seed to be sowed, a revoluble gate for varying the size of said passage for discharge, and with the gate formed with a sharp corner constituting the aforesaid pointer.

The invention further aims to provide, in a manner as hereinafter set forth, a device for the purpose referred to including a means for regulating the number or volume of the seed to be broadcasted formed with a segmental passage for the seed, and a revoluble gate for varying the size of said passage substantially of quadrangular contour having a part thereof constituting a handle or grip, another part forming a latching number, and still another part positioned in proximity to one side of the handle providing the aforesaid pointer.

The invention further aims to povide, in a manner as hereinafter set forth, a device for the purpose referred to which is simple in its construction and arrangement, strong, durable, compact, conveniently handled and regulated, thoroughly efficient in its use, readily assembled, and comparatively inexpensive to manufacture.

Embodying the aims aforesaid and others which may hereinafter appear, the invention consists of the novel construction, combination and arrangement of parts as will be more specifically described and illustrated in the accompanying drawing, wherein is shown an embodiment of the invention, but it is to be understood that changes, variations and modifications may be resorted to which fall within the scope of the invention as claimed.

In the drawing:

Figure 1 is a perspective view of the seeder as it appears in position for use.

Figure 2 is a fragmentary view of the horn, upon an enlarged scale in longitudinal section, Figure 3 is an elevation upon an enlarged scale looking towards the outer face of the regulator or gauge, Figure 4 is a section on line 4—4 Figure 3, and Figure 5 is a section on line 5—5 Figure 1.

With reference to the drawing, 9 indicates the simulation of a person supporting and using the device 10. The latter includes a seed containing bag or sack 11 open at its top and arranged to be suspended from the neck of the person by means of a suspension strap 12. Extending laterally from the bottom of one side of the bag or sack 11 is a flexible discharge spout 13, which is of tapered formation outwardly from its point of connection with the said side of the bag. The free end terminal portion of the spout 13 is inturned upon itself, as at 14, and anchored by the stitching 15 to form a hem for reinforcing the outer end of the spout.

The device 10 includes a tapered tubular sectional distributing horn 16 for the seed. The horn 16 preferably will consist of an outer section, an intermediate section and an inner section and is so shown. The outer, intermediate and inner sections are designated respectively 17, 18 and 19. The sections taper throughout from their inner to their outer ends. The sections 17, 18 preferably will be of like length and of materially greater length than the section 19. The sections of the horn are adapted to detachably frictionally engage one with the other whereby when the horn is set up for use it will appear as shown by Figure 1. The outer terminal portion of the section 18 is to extend into the inner terminal portion of the section 17 and their diameters at such points will provide for a friction joint therebetween whereby the section 17 will be detachably secured to and extended outwardly from section 18. The outer terminal portion of section 19 is to extend into the inner terminal portion of the section 18 and their diameters at such points will provide for a friction joint therebetween, whereby the section 18 will be detachably secured to and extended outwardly from section 19.

The outer terminal portion of horn section 17 has secured therein and extended therefrom a pair of yoke shaped seed abutment members 20, 21 disposed at right angles to each other. The bights 22, 23 of the members 20, 21 respectively are spaced outwardly from the outer terminus of horn section 17. The bight 22 of member 20 is arranged outwardly of the bight 23 of member 21. The bight 23 abuts the bight 22 centrally of the latter. The members 20, 21 act as a means to insure for the proper spraying or spreading of the seed when broadcasted from the device. The inner end terminal portion of the horn section 19 is bent inwardly upon itself to form a pair of abutting folds 24, 25 and said folded terminal portion is flared to provide an annular flange 26 of outwardly inclined cross sectional contour. The flange 26 constitutes a means for connecting the inner end of the horn section 19 to the hemmed outer end of the spout 13, and in this connection the hemmed outer end of spout 13 is stretched over the flange 26 and such end not only engages the outer periphery of horn section 19 in close proximity to the flange 26, but the inner face of the outer end of the spout 13 bears against the outer face of flange 26, whereby the horn section 19 is tightly secured to the spout 13. The horn section 19 not only constitutes a grip for the user to grasp the horn to shift the latter when broadcasting, but it also constitutes a carrier for the seed regulator or gauge 27, which is mounted in the outer end terminal portion of the section 19.

The regulator of gauge 27, for controlling the number or volume of the seed broadcasted includes a vertically disposed forwardly opening annular cup-shaped member 28 formed of an annular body part 29 and a circular wall 30 integral with the inner face of body part 29 at the inner end of the latter. The wall 30 is formed with a cutout of a contour to provide in connection with the edge of the cutout and a portion of the inner face of body part 29 a segmental shaped passage 31 for the travel of the seed from horn section 19 into horn section 18. The dimensions of the passage 31 are regulated, by a means to be referred to, for controlling the number or volume of the seed passing from horn section 19 into horn section 18. The regulator 27 includes a revoluble gate 32 for regulating or varying the dimensions of the passage 31 for the purpose aforesaid. The gate 32 is substantially of quadrangular contour and it is formed of a plate 33 having a curved edge 34 and a pair of straight edges 35, 36 merging at one end into each other and disposed at right angles. The other ends of the edges 35, 36 merge into the ends of the edge 34. The gate 32 is arranged within member 28 against the face of wall 30 and when so arranged has its edge 34 capable of slidably engaging a portion of the inner face of body part 29. The gate 32 is revolubly connected against the forward face of wall 30 by an upset rivet 37, which is disposed axially of said wall 30. With respect to the gate 32, the rivet 37 is arranged above the transverse median and between the vertical median and edge 36 of said gate. The latter is formed with a handle, finger piece or grip 38 to facilitate the revolving thereof and it will be hereinafter referred to as a handle. The handle 38 is integral with and is disposed at right angles to the gate edge 35. The handle 38 is of less length than edge 35 and extends from edge 34 to a point removed from edge 36. The handle 38 has a close sliding fit with the forward face of wall 30.

The meeting point of the edges 35, 36 form a pointer 39 and it is conventionally indicated at 40. The pointer 39 correlates with a scale of graduations 41 which are associated with a scale of digits 42. The graduations 41 and digits 42 are arranged on the forward face of wall 30, spaced from pointer 39 and permanently exposed with respect to gate 32. The wall 30 is formed with an arcuate row of spaced radial projections 43 in its outer marginal portion forming grooves 44 constituting keepers capable of being selectively engaged by a latching member 45 for releasably retaining the gate 32 in its adjusted position. The member 45 is provided by an inset portion 46 of the gate 32.

The directions for setting and operating the seed sower are to wit: The regulator or gauge is first set, as to timothy when the pointer is disposed in relation to digit "1" and the device will sow four pints per acre fourteen feet wide; as to clover, the pointer is set relative to digit "2" and the device sows eight pints per acre eighteen feet wide; as to flax or millet, the pointer is set relative to digit "3" and the device sows twelve quarts per acre eighteen feet wide; with respect to alfalfa the pointer is set relatively to figure "4" and the device sows twenty pounds per acre twenty-five feet wide; and with respect to wheat, the pointer is set relative to digit "5" and the device sows one and one-half bushels per acre twenty-five feet wide. After the regulator has been set at the desired point the other horn sections are connected together and to that section which carries the regulator.

It is necessary that the horn section which carries the regulator is turned in position so that the regulator or gauge opening is at the bottom or floor of such section.

What I claim is:

1. In a seed sower, a tubular discharging element including a rear detachable section for connection to the outlet spout of a seed container, an annular forwardly opening cup-shaped member secured in the forward terminal portion of said section having a rear wall formed with a segmental shaped opening, an adjustable revoluble gate of substantially quadrangular contour having a close sliding fit with the forward face of said wall for varying the size of said opening, said wall being formed on its forward face with a scale permanently visible with respect to said gate, said gate including a sharp corner constituting a pointer for correlation with said scale, and said gate and wall having coacting means for latching the gate in adjusted position.

2. In a seed sower a tubular discharging element including a detachable section, an annulus secured within said section at the forward end of the latter, a wall secured to the rear end of the annulus and being cutout, said cutout coacting with a part of the rear end of the annulus to provide a passage of segmental contour, an adjustable revoluble gate substantially of quadrangular contour connected to and having a close sliding fit with the forward face of said wall and providing when adjusted for varying the dimensions of said passage for seed discharge, said wall having its forward face formed with a scale adjacent to and permanently visible with respect to said gate, said gate being formed with a sharp corner constituting a pointer for correlation with said scale, and selectably interengaging means on the front of said wall and the rear of said gate for latching the latter in adjusted position.

LEVI O. STARK.